J. G. L. BOETTCHER.
PIPE AND HOSE COUPLING.
No. 183,891. Patented Oct. 31, 1876.
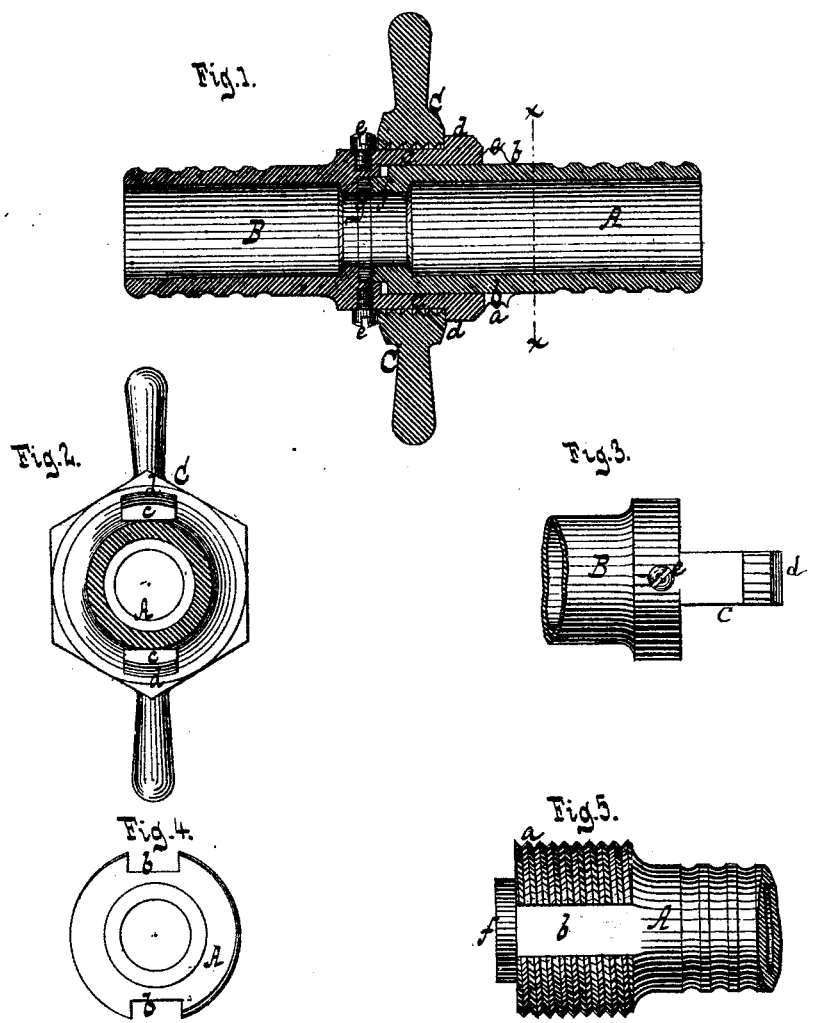

UNITED STATES PATENT OFFICE.

JOHN G. L. BOETTCHER, OF BROOKLYN, NEW YORK.

IMPROVEMENT IN PIPE AND HOSE COUPLINGS.

Specification forming part of Letters Patent No. 183,891, dated October 31, 1876; application filed September 22, 1876.

*To all whom it may concern:*

Be it known that I, JOHN G. L. BOETTCHER, of Brooklyn, in the county of Kings and State of New York, have invented a new and Improved Pipe and Hose Coupling, which improvement is fully set forth in the following specification, reference being had to the accompanying drawing, in which—

Figure 1 represents a longitudinal central section. Fig. 2 is a transverse section in the plane $x\,x$, Fig. 1. Fig. 3 is a side view of one of the half-couplings, which may properly be termed the "detachable" half-coupling. Fig. 4 is an end view of the other or "stationary" half-coupling. Fig. 5 is a side view of the same.

Similar letters indicate corresponding parts.

This invention relates to a pipe and hose coupling, one half of which is provided with a screw-thread at its end and with two or more grooves for the reception of lugs which project from the other or detachable half-coupling, and which are provided with shoulders, against which bears a nut which fits the screw-thread on the first or stationary half-coupling, so that, when the lugs of the detachable half-coupling are introduced into the guide-grooves of the stationary half-coupling and the nut is turned in the proper direction, the two half-couplings are drawn together without allowing either of said half-couplings to turn round independent of the other.

In the drawing, the letter A designates the stationary half-coupling, which is provided at its end with a screw-thread, $a^2$, and with two or more grooves, $b$, (best seen in Figs. 4 and 5,) which run parallel with the axis of the half-coupling. The letter B designates the detachable half-coupling, which is provided with lugs $c$ projecting from its ends and made to fit the grooves $b$ in the stationary half-coupling A. On the ends of the lugs $c$ are formed shoulders $d$, and on said lugs slides a nut, C, which fits the screw-thread $a$ on the stationary half-coupling, and abuts against the shoulders $d$ of the lugs, as shown in Fig. 1. Behind this nut may be placed stops $e$ for the purpose of preventing said nut from dropping out. These stops, however, must be so situated that the nut can be freely turned round.

When the two half-couplings are to be united, the lugs $c$ of the detachable half-coupling are introduced into the guide-grooves $b$, and, by turning the nut C in the proper direction, the two half-couplings are drawn together and the face $f$ of the stationary half-coupling is brought to bear against a packing-ring, $g$, inserted in a groove in the detachable half-coupling, so as to produce a tight joint.

This device may be used for various purposes—for instance, for an ordinary hose-coupling, in which case one piece of hose will be fastened to the half-coupling A, and the other piece to the half-coupling B, or it may be used for connecting a lead pipe to the spout of a faucet or stop-cock, in which case the half-coupling A will take the place of the spout, and the end of the half-coupling B will be reduced, so that it can be inserted into and soldered to the end of the lead pipe. In all cases, however, the connection is such that, by turning the nut C, the two half-couplings are drawn together without allowing either of them to turn independent of the other, and all danger of twisting the hose or pipe attached to either of the half-couplings is avoided.

What I claim as new, and desire to secure by Letters Patent, is—

The combination of two half-couplings, A B, one of which is provided with a screw-thread, $a$, and grooves $b$, while the other has lugs $c$, which fit the grooves $b$, and have shoulders $d$, against which abuts a nut, C, which fits the screw-thread $a$, the whole being constructed and operating substantially as shown and described.

In testimony that I claim the foregoing I have hereunto set my hand and seal this 19th day of September, 1876.

JOHN G. L. BOETTCHER. [L. S.]

Witnesses:
W. HAUFF,
E. F. KASTENHUBER.